United States Patent
Moro, Jr. et al.

(10) Patent No.: US 11,197,122 B1
(45) Date of Patent: Dec. 7, 2021

(54) CROWD-SOURCED DETECTION AND TRACKING OF UNMANNED AERIAL SYSTEMS

(71) Applicant: Raytheon Company, Waltham, MA (US)

(72) Inventors: Richard A. Moro, Jr., Melrose, MA (US); John M. Bergeron, Northfield, NH (US)

(73) Assignee: Raytheon Company, Waltham, MA (US)

( * ) Notice: Subject to any disclaimer, the term of this patent is extended or adjusted under 35 U.S.C. 154(b) by 0 days.

(21) Appl. No.: 16/946,161

(22) Filed: Jun. 8, 2020

(51) Int. Cl.
*H04W 24/00* (2009.01)
*H04W 4/021* (2018.01)
*G08B 21/18* (2006.01)
*H04W 4/02* (2018.01)
*H04W 68/00* (2009.01)

(52) U.S. Cl.
CPC ............ *H04W 4/021* (2013.01); *G08B 21/18* (2013.01); *H04W 4/025* (2013.01); *H04W 68/005* (2013.01)

(58) Field of Classification Search
CPC ... H04W 4/021; H04W 4/025; H04W 68/005; G08B 21/18
USPC ...................................................... 455/456.3
See application file for complete search history.

(56) References Cited

U.S. PATENT DOCUMENTS

| | | |
|---|---|---|
| 4,109,883 A | 8/1978 | Korr et al. |
| 4,817,495 A | 4/1989 | Drobot |
| 5,059,839 A | 10/1991 | Rose et al. |
| 5,192,827 A | 3/1993 | Jasper, Jr. |
| 5,251,550 A | 10/1993 | Grossler et al. |
| 5,645,137 A | 7/1997 | Pacholok |
| 5,835,545 A | 11/1998 | Turchi |
| 6,679,179 B1 | 1/2004 | Bohl et al. |
| 7,071,631 B2 | 7/2006 | Howard, II |
| 7,475,624 B1 | 1/2009 | Daily |
| 7,629,918 B2 | 12/2009 | Brown et al. |

(Continued)

FOREIGN PATENT DOCUMENTS

| FR | 2783316 A1 | 3/2000 |
|---|---|---|
| WO | 2016193722 A1 | 12/2016 |

OTHER PUBLICATIONS

Office Action dated Oct. 23, 2020 in connection with U.S. Appl. No. 16/100,749, 78 pages.

(Continued)

*Primary Examiner* — Amancio Gonzalez

(57) ABSTRACT

A method includes receiving a first notification of an unmanned aerial system (UAS) flying in an area. The method also includes sending a second notification to multiple mobile devices of multiple users located in the area, where the second notification requests the multiple users to look for the UAS. The method further includes receiving information about the UAS from one or more of the mobile devices of one or more of the users, where the information is obtained by the one or more mobile devices. The method also includes determining an assessment of the UAS based on the information about the UAS received from the one or more mobile devices. In addition, the method includes sending a third notification to at least some of the mobile devices, where the third notification includes information regarding the assessment of the UAS.

20 Claims, 4 Drawing Sheets

(56) References Cited

U.S. PATENT DOCUMENTS

| | | | |
|---|---|---|---|
| 7,775,146 | B1 | 8/2010 | Bitar et al. |
| 9,500,446 | B2 | 11/2016 | Crouch et al. |
| 9,689,976 | B2* | 6/2017 | Parker ..................... G01S 13/86 |
| 9,755,931 | B2* | 9/2017 | Pan ........................ H04L 12/66 |
| 10,752,355 | B1* | 8/2020 | Flick ...................... G06Q 40/08 |
| 2008/0156219 | A1 | 7/2008 | Voss et al. |
| 2010/0018428 | A1 | 1/2010 | Regebro |
| 2010/0181424 | A1* | 7/2010 | Goossen ............. F41H 13/0006 |
| | | | 244/11 OF |
| 2010/0295717 | A1 | 11/2010 | Rourk |
| 2011/0203476 | A1 | 8/2011 | Smogitel |
| 2017/0111102 | A1* | 4/2017 | Fan .................... H04B 7/18504 |
| 2017/0191804 | A1 | 7/2017 | Stark et al. |
| 2017/0253348 | A1 | 9/2017 | Ashdown et al. |
| 2017/0261292 | A1 | 9/2017 | Armstrong et al. |
| 2019/0120600 | A1 | 4/2019 | Holihan et al. |
| 2020/0272827 | A1* | 8/2020 | Morrow ............... G08G 5/0082 |
| 2020/0310414 | A1* | 10/2020 | Torii ..................... B64C 39/024 |

OTHER PUBLICATIONS

Notice of Allowance dated Dec. 8, 2020 in connection with U.S. Appl. No. 16/100,749, 87 pages.

Ackerman, "Raytheon Sets Phasers to Drone Destruction with Directed Energy Weapon Test," IEEE Spectrum, Nov. 2016, 2 pages.

Battelle, "DroneDefender," Brochure ID 510, Battelle Memorial Institute, Mar. 2017, 2 pages.

"Counter UAS Directory—Nov. 2018.V3," www.unmannedairspace.info, Nov. 2018, 81 pages.

Federal Aviation Administration, "FAA Expands Drone Detection Pathfinder Initiative," Jul. 2016, 2 pages.

Lewis, "Raytheon EMP weapon tested by Boeing, USAF Research Lab," MMXVII Military Embedded Systems, Nov. 2012, 2 pages.

"Skywall—Capture Drones—Protect Assets," OpenWorks Engineering Ltd., Dec. 2016, 15 pages.

Gibbs, "The Guardian," OpenWorks Engineering Ltd., Mar. 2016, 3 pages.

Patel et al., "What is India's secret EMP weapon KALI 5000," www.quora.com, Mar. 2015, 8 pages.

Pender et al., "Electrical Engineers' Handbook; vol. V; Electric Communication and Electronics," 1936, p. 7-158.

Prabhu, "Build your own mini-EMP generator and disrupt electronic gadgets," TechWorm, Jul. 2016, 5 pages.

Zhang, "This Rifle Shoots Down Drones with Radio Waves," www.petapixel.com, Oct. 2015, 12 pages.

Wikipedia, "LC circuit," May 19, 2020, 9 pages.

International Search Report and Written Opinion of the International Searching Authority dated Oct. 30, 2018 in connection with International Patent Application No. PCT/US2018/046242, 13 pages.

U.S. Appl. No. 16/946,157 entitled "Threat Assessment of Unmanned Aerial Systems Using Machine Learning" filed Jun. 8, 2020, 36 pages.

* cited by examiner

CROWD-SOURCED DETECTION AND TRACKING OF UNMANNED AERIAL SYSTEMS

TECHNICAL FIELD

This disclosure is generally directed to unmanned aerial systems. More specifically, this disclosure is directed to crowd-sourced detection and tracking of unmanned aerial systems or other manned or unmanned vehicles.

BACKGROUND

Inexpensive, small unmanned aerial systems (UASs) such as drones are proliferating rapidly. Numerous applications for UASs have been proposed and implemented, such as infrastructure and utility inspections, surveillance, package delivery, urban mobility, and the like. While most use cases involving UASs are beneficial, some UASs can be used for nefarious purposes, and these UASs can represent significant threats to a wide variety of targets. Unfortunately, the detection, discrimination, and threat assessment of UASs can be difficult, especially since the UASs often fly at low altitudes.

SUMMARY

This disclosure relates to crowd-sourced detection and tracking of unmanned aerial systems.

In a first embodiment, a method includes receiving a first notification of an unmanned aerial system (UAS) flying in an area. The method also includes sending a second notification to multiple mobile devices of multiple users located in the area, where the second notification requests the multiple users to look for the UAS. The method further includes receiving information about the UAS from one or more of the mobile devices of one or more of the users, where the information is obtained by the one or more mobile devices. The method also includes determining an assessment of the UAS based on the information about the UAS received from the one or more mobile devices. In addition, the method includes sending a third notification to at least some of the mobile devices, where the third notification includes information regarding the assessment of the UAS.

In a second embodiment, a system includes at least one memory configured to store instructions and at least one processor coupled to the at least one memory. The at least one processor is configured when executing the instructions to receive a first notification of a UAS flying in an area. The at least one processor is also configured when executing the instructions to send a second notification to multiple mobile devices of multiple users located in the area, where the second notification requests the multiple users to look for the UAS. The at least one processor is further configured when executing the instructions to receive information about the UAS from one or more of the mobile devices of one or more of the users, where the information is obtained by the one or more mobile devices. The at least one processor is also configured when executing the instructions to determine an assessment of the UAS based on the information about the UAS received from the one or more mobile devices. In addition, the at least one processor is configured when executing the instructions to send a third notification to at least some of the mobile devices, where the third notification includes information regarding the assessment of the UAS.

In a third embodiment, a non-transitory computer readable medium contains instructions that when executed cause at least one processor to receive a first notification of a UAS flying in an area. The non-transitory computer readable medium also contains instructions that when executed cause the at least one processor to send a second notification to multiple mobile devices of multiple users located in the area, where the second notification requests the multiple users to look for the UAS. The non-transitory computer readable medium further contains instructions that when executed cause the at least one processor to receive information about the UAS from one or more of the mobile devices of one or more of the users, where the information is obtained by the one or more mobile devices. The non-transitory computer readable medium also contains instructions that when executed cause the at least one processor to determine an assessment of the UAS based on the information about the UAS received from the one or more mobile devices. In addition, the non-transitory computer readable medium contains instructions that when executed cause the at least one processor to send a third notification to at least some of the mobile devices, where the third notification includes information regarding the assessment of the UAS.

Other technical features may be readily apparent to one skilled in the art from the following figures, descriptions, and claims.

BRIEF DESCRIPTION OF THE DRAWINGS

For a more complete understanding of this disclosure, reference is now made to the following description, taken in conjunction with the accompanying drawings, in which.

DETAILED DESCRIPTION

Figure 1:
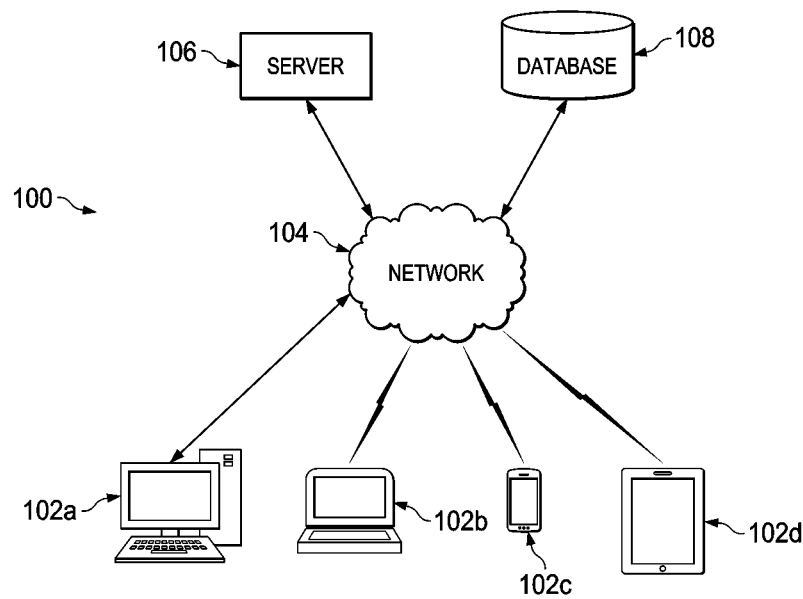
FIG. 1 illustrates an example system for crowd-sourced detection and tracking of unmanned aerial systems (UASs) according to this disclosure.

FIGS. 1 through 5, described below, and the various embodiments used to describe the principles of the present invention in this patent document are by way of illustration only and should not be construed in any way to limit the scope of the invention. Those skilled in the art will understand that the principles of the present invention may be implemented in any type of suitably arranged device or system.

As noted above, unmanned aerial systems or "UASs" (such as drones or other unmanned aerial vehicles) are proliferating rapidly. Numerous beneficial applications for UASs have been proposed and implemented. However, some UASs can be used for nefarious purposes, and these UASs can represent significant threats to a wide variety of targets. Unfortunately, the detection, discrimination, and threat assessment of UASs can be difficult, especially since the UASs often fly at low altitudes. Moreover, UASs often fly in high-clutter environments with limited lines of sight, and small UASs are easily transported to different locations where they can be launched as pop-up threats with short attack timelines. In addition, traditional equipment for detection, discrimination, assessment, and mitigation are expensive and manually intensive, which limits their use.

Some existing approaches for UAS detection rely on cooperative communication, such as where a UAS or its operator provides information about the UAS (like a flight plan, reserved airspace, and vehicle position) to an interested party that observes the UAS. These approaches are primarily focused on enabling legal, commercial, and recreational actors. However, these approaches are inadequate or ineffective for addressing non-compliant, non-cooperative, and/or hostile actors. In such cases, it is often necessary to detect and assess a UAS without information voluntarily provided by the UAS or its operator. It may be possible to protect populated areas or areas with critical infrastructure with detection sensors, such as radar or high-performance imaging systems. However, these solutions are generally considered to be too costly from an acquisition, staffing, and sustainment perspective for wide-scale deployment in urban or suburban areas, especially given the limited lines of sight at low altitudes and high clutter environments such as in urban or suburban "canyons" that result from man-made structures.

This disclosure provides systems and methods for crowd-sourced detection and tracking of UASs. As described in more detail below, disclosed systems and methods provide for a centralized UAS tracking entity to receive information about one or more UASs from mobile devices of multiple users, such as users in a crowd. Based on the received information, the UAS tracking entity can make an assessment of each UAS. The UAS tracking entity can also send notifications of its assessments to at least some of the users, and the UAS tracking entity can further send assessment information to other entities such as law enforcement personnel.

While this disclosure is described with respect to UASs, it will be understood that the principles disclosed herein are also applicable to other types of vehicles in areas of limited sensor coverage. For example, the disclosed embodiments can also be used with manned aerial vehicles (e.g., low flying aircraft) and vehicles in other domains (e.g., maritime or land traffic).

FIG. 1 illustrates an example system 100 for crowd-sourced detection and tracking of UASs according to this disclosure. As shown in FIG. 1, the system 100 includes multiple user devices 102a-102d, at least one network 104, at least one server 106, and at least one database 108. Note, however, that other combinations and arrangements of components may also be used here.

In this example, each user device 102a-102d is coupled to or communicates over the network 104. Communications between each user device 102a-102d and a network 104 may occur in any suitable manner, such as via a wired or wireless connection. Each user device 102a-102d represents any suitable device or system used by at least one user to provide information to the server 106 or database 108 or to receive information from the server 106 or database 108. Example types of information may include UAS photographs, UAS location data, communication or control signals associated with a UAS, and the like.

Any suitable number(s) and type(s) of user devices 102a-102d may be used in the system 100. In this particular example, the user device 102a represents a desktop computer, the user device 102b represents a laptop computer, the user device 102c represents a smartphone, and the user device 102d represents a tablet computer. However, any other or additional types of user devices may be used in the system 100. Each user device 102a-102d includes any suitable structure configured to transmit and/or receive information.

The network 104 facilitates communication between various components of the system 100. For example, the network 104 may communicate Internet Protocol (IP) packets, frame relay frames, Asynchronous Transfer Mode (ATM) cells, or other suitable information between network addresses. The network 104 may include one or more local area networks (LANs), metropolitan area networks (MANs), wide area networks (WANs), all or a portion of a global network such as the Internet, or any other communication system or systems at one or more locations. The network 104 may also operate according to any appropriate communication protocol or protocols.

The server 106 is coupled to the network 104 and is coupled to or otherwise communicates with the database 108. The server 106 supports the retrieval of information from the database 108 and the processing of that information. Of course, the database 108 may also be used within the server 106 to store information, in which case the server 106 may store the information itself. Among other things, the server 106 processes information used in crowd-sourced detection and tracking of UASs. Examples of the processing operations of the server 106 are provided below.

The server 106 includes any suitable structure configured to process information for crowd-sourced detection and tracking of UASs. In some embodiments, the server 106 includes one or more processors, one or more memories, and one or more communication interfaces. Note, however, that the server 106 may be implemented in any suitable manner to perform the described functions. Also note that while described as a server here, the device(s) actually implementing the server 106 may represent one or more desktop computers, laptop computers, server computers, or other computing or data processing devices or systems. In some embodiments, the server 106 may include or be part of a cloud-based processing environment.

The database 108 stores various information used, generated, or collected by the server 106 and the user devices 102a-102d. For example, the database 108 may store UAS photographs, UAS location and flight path (e.g., track or trajectory) data, communication or control signals associated with a UAS, and the like. In some cases, at least some of the information to be stored by the database 108 may be received from the user devices 102a-102d directly or indirectly, such as via the server 106. In some cases, the information may be received from sensors such as radars or high performance imaging systems.

There are a number of possible ways to implement the system 100 in order to provide the described functionality for crowd-sourced detection and tracking of UASs. For example, in some embodiments, the server 106 and database 108 are owned, operated, or managed by a common entity. In other embodiments, the server 106 and database 108 are owned, operated, or managed by different entities. Note, however, that this disclosure is not limited to any particular organizational implementation.

Although FIG. 1 illustrates one example of a system 100 for crowd-sourced detection and tracking of UASs, various changes may be made to FIG. 1. For example, the system 100 may include any number of user devices 102a-102d, networks 104, servers 106, and databases 108. Also, while FIG. 1 illustrates that one database 108 is coupled to the network 104, any number of databases 108 may reside at any location or locations accessible by the server 106, and each database 108 may be coupled directly or indirectly to the server 106. In addition, while FIG. 1 illustrates one example operational environment in which crowd-sourced detection and tracking of UASs may be used, this functionality may be used in any other suitable system.

Figure 2:
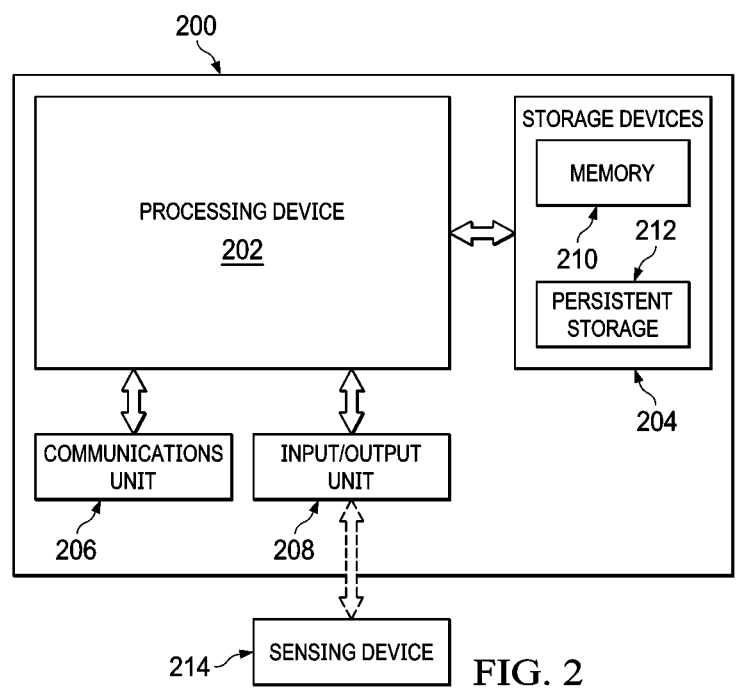
FIG. 2 illustrates an example device for crowd-sourced detection and tracking of UASs according to this disclosure.

FIG. 2 illustrates an example device 200 for crowd-sourced detection and tracking of UASs according to this disclosure. One or more instances of the device 200 may, for example, be used to at least partially implement the functionality of the server 106 of FIG. 1. However, the functionality of the server 106 may be implemented in any other suitable manner. Also, the same or similar arrangement of components may be used to at least partially implement the functionality of one or more of the user devices 102a-102d in FIG. 1. However, the functionality of each user device 102a-102d may be implemented in any other suitable manner.

As shown in FIG. 2, the device 200 denotes a computing device or system that includes at least one processing device 202, at least one storage device 204, at least one communications unit 206, and at least one input/output (I/O) unit 208. The processing device 202 may execute instructions that can be loaded into a memory 210. The processing device 202 includes any suitable number(s) and type(s) of processors or other devices in any suitable arrangement. Example types of processing devices 202 include one or more microprocessors, microcontrollers, digital signal processors (DSPs), application specific integrated circuits (ASICs), field programmable gate arrays (FPGAs), or discrete circuitry.

The memory 210 and a persistent storage 212 are examples of storage devices 204, which represent any structure(s) capable of storing and facilitating retrieval of information (such as data, program code, and/or other suitable information on a temporary or permanent basis). The memory 210 may represent a random access memory or any other suitable volatile or non-volatile storage device(s). The persistent storage 212 may contain one or more components or devices supporting longer-term storage of data, such as a read only memory, hard drive, Flash memory, or optical disc.

The communications unit 206 supports communications with other systems or devices. For example, the communications unit 206 can include a network interface card or a wireless transceiver facilitating communications over a wired or wireless network, such as the network 104. The communications unit 206 may support communications through any suitable physical or wireless communication link(s).

The I/O unit 208 allows for input and output of data. For example, the I/O unit 208 may provide a connection for user input through a keyboard, mouse, keypad, touchscreen, or other suitable input device. The I/O unit 208 may also provide a connection for an optional "add-on" sensing device 214, such as a sensor or camera, that can be added as an accessory to the device 200. The I/O unit 208 may also send output to a display, printer, or other suitable output device. Note, however, that the I/O unit 208 may be omitted if the device 200 does not require local I/O, such as when the device 200 can be accessed remotely.

In some embodiments, the instructions executed by the processing device 202 can include instructions that implement the functionality of the server 106. For example, the instructions executed by the processing device 202 can include instructions for crowd-sourced detection and tracking of UASs. In other embodiments, the instructions executed by the processing device 202 can include instructions that implement the functionality of the user devices 102a-102d. For instance, the instructions executed by the processing device 202 can include instructions for providing UAS-related information to the server 106 and for receiving UAS-related notifications from the server 106.

Although FIG. 2 illustrates one example of a device 200 for crowd-sourced detection and tracking of UASs, various changes may be made to FIG. 2. For example, computing devices/systems and mobile devices come in a wide variety of configurations, and FIG. 2 does not limit this disclosure to any particular computing device or system or to any particular mobile device.

Figure 3:
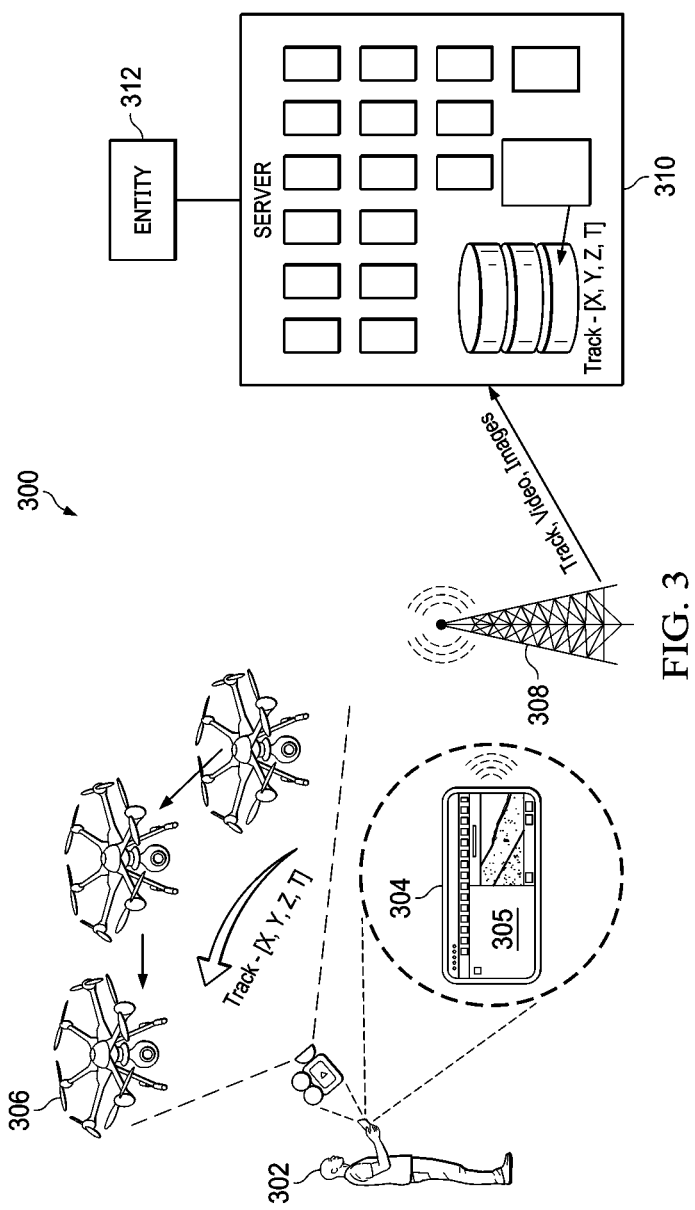
FIG. 3 illustrates an example environment in which crowd-sourced detection and tracking of UASs can be performed according to this disclosure.

FIG. 3 illustrates an example environment 300 in which crowd-sourced detection and tracking of UASs can be performed according to this disclosure. For ease of explanation, the environment 300 is described as being used with the system 100 of FIG. 1, which may be implemented using one or more devices 200 of FIG. 2. However, the environment 300 may involve the use of any suitable device(s) in any suitable system(s).

As shown in FIG. 3, the environment 300 includes at least one user 302 that is located in an area where a UAS 306 is flying. While FIG. 3 illustrates only one user 302, it will be understood that the environment 300 typically includes more than one user 302 and can include many (such as dozens, hundreds, or thousands) of users 302 that are located in an area near the UAS 306 or its flight path. Also, while FIG. 3 illustrates only one UAS 306, it will be understood that the environment 300 may include multiple UASs 306, where one or more users 302 are located in an area near each UAS 306 or its flight path.

Each user 302 possesses or has access to a mobile device 304. Each mobile device 304 represents a computing device or system that is capable of detection and tracking of UASs, such as the UAS 306. In some embodiments, each mobile device 304 includes one or more sensors (such as a camera, Wi-Fi sensor, BLUETOOTH sensor, microphone, and the like) capable of sensing or detecting information about the UAS 306. Example types of mobile devices 304 can include mobile telephones, tablet computers, laptop computers, and the like. In some embodiments, the mobile device 304 represents (or is represented by) one of the user devices 102a-102d in FIG. 1 or the device 200 in FIG. 2 described above.

Each mobile device 304 may include an application (or "app") 305 installed on the mobile device 304. The app 305 provides a graphical user interface (GUI) for interaction with the user 302 and program instructions for detection and tracking of UASs. The app 305 also facilitates communication between the mobile device 304 and a server 310 over a network 308 for sharing information about the UAS 306. In some embodiments, the app 305 is provided by an entity 312 that collects and processes UAS detection- and tracking-related information. In particular embodiments, the app 305 is licensed to each user 302 and installed on each mobile device 304 as part of a collaborative "freemium" business model. In such a business model, each user 302 is considered a "prosumer" (a portmanteau of "producer" and "consumer") because the user 302 both generates UAS-related information for use by the server 310 and receives UAS-related information from the server 310.

The app 305 enables the recruitment of many users 302 to join a community and use the short-range sensing technologies already available in their mobile devices 304 to look for low-altitude UASs, such as the UAS 306. In some embodiments, the app 305 may provide a reward to each user 302 that submits useful information about a UAS 306. For example, the reward may be a credit for an in-app purchase, access to information about the spotted UAS 306, and the like.

In this example, the UAS 306 represents a small UAS that typically operates at low altitudes and may operate in one or more areas with limited lines of sight, such as urban or suburban areas. In the environment 300, the UAS 306 is in flight and proceeds along a flight path. Because information about the UAS 306 may not be readily or immediately known to the entity 312, the environment 300 enables the users 302 to use their mobile devices 304 to collect information about the UAS 306 and provide the information to the server 310, which is owned or controlled by the entity 312.

The server 310 represents a computing device or system that is capable of processing information for the detection and tracking of UASs, such as the UAS 306. In some embodiments, the server 310 represents (or is represented by) the server 106 in FIG. 1 or the device 200 in FIG. 2 described above. In some embodiments, the server 310 can be a cloud-based server or group of servers or other computing devices.

The server 310 performs tracking of the UAS 306 by receiving, correlating, and processing information about the UAS 306 (such as images or videos, audio recordings, control signal detection, user observations or comments obtained via a GUI of the app 305, and the like) from the mobile devices 304. In some embodiments, the information can be obtained from multiple sensing positions or angles. Also, in some embodiments, the information can be GPS-tagged or otherwise correlated with location information. The server 310 can process the collected information using a track estimation algorithm, which can generate track details of the UAS 306. The track details can describe the prior and estimated future track of the UAS 306, such as its altitude, flight path, speed, and the like. Depending on the information received, the server 310 may use multiple data items in one or more triangulation algorithms to determine the location of the UAS 306 and track its flight path. For example, image processing of multiple images or videos captured from different locations may be used in conjunction with triangulation algorithms to determine the location of the UAS 306. Tracking accuracy can be dependent on the number and spatial distribution of the mobile devices 304, the quality of the sensor inputs, and the availability of other information sources for a specific UAS contact.

Using the information received from the mobile devices 304, the server 310 can also perform discrimination of the UAS 306, such as by identifying its specific make, model, and payload(s) (if any). For example, the server 310 can use image and audio recognition algorithms, as well as human observations that are input via a GUI of the app 305. The server 310 can also perform discrimination of likely intent, adjudication of potential threat, and recommendation of appropriate mitigation actions to one or more actors on the spectrum. For example, industrial operators may need to temporally cease their UAS operations, law enforcement may need to locate the ground control station of the UAS 306 and ticket or arrest the UAS operator, or federal agencies may need to employ kinetic or non-kinetic counters. In addition, the server 310 can perform detection, location, and identification of the ground control station and the operator of the UAS 306. These can be performed in a similar manner as the discrimination of the UAS 306 itself.

The server 310 is capable of discrimination and adjudication of potential threats using one or more algorithms, such as those that utilize object-based production (OBP), activity-based intelligence (ABI), or both. Such algorithms can perform an initial assessment of the UAS 306 and its potential threat. Based on the initial assessment, the server 310 can escalate to another authorized actor for further adjudication or mitigation, or de-escalate if the assessment indicates a low threat. In some cases, the server 310 can also send specific notifications to one or more users 302 to request further information or to recommend an action such as "seek shelter" or "your flight operations."

In some embodiments, the information provided to the server 310 may be aggregated as a data set that can enable one or more artificial intelligence (AI) or other machine learning (ML) algorithms or routines. The accuracy of the AI/ML, algorithms or routines can improve over time as a network of users 302 and mobile devices 304 grows, thus providing a larger reference database for training and evaluation. In particular, crowd sourcing with multiple observations from multiple mobile devices 304 may enable a method to validate a ground truth of sensor data and human-machine interface (HMI) data, as well as discrimination and adjudication decisions. In addition, in some embodiments, the aggregated data set can be packaged as a product or service that can be sold, licensed, or otherwise offered to interested parties.

The detection and collection of information about a UAS 306 can be initiated by at least one of the users 302, such as when one or more users 302 observe the UAS 306 flying. In other instances, the trigger to start the process might be another third-party system (such as an unmanned traffic management (UTM) system, a radar system, an optical tracking system such as Multi-Spectral Targeting System (MTS) from RAYTHEON TECHNOLOGIES CORP., and the like) detecting the presence of an unidentified object. That third-party system may then request the server 310 to send a geospatial alert notification to the users 302 via the app 305 on their mobile devices 304. In still other instances, the trigger to start the process may be a social media posting of a UAS flying in an area, which may automatically generate a geospatial alert notification to the users 302 via the app 305.

As one particular example, a user 302 may observe the UAS 306 and report the observation to the server 310 over the network 308 using the app 305. The server 310 may then send a notification to a crowd of users 302 in a nearby area (such as within a 1 kilometer radius of the observing user 302) via the app 305. The notification informs the crowd of users 302 of any known information about the UAS 306 and requests the users 302 to look for the UAS 306 and record any possible information about the UAS 306. For example, the users 302 may capture photographs or videos of the UAS 306, record audio of sounds made by the UAS 306, generate text comments about the UAS 306, and the like. In some embodiments, the app 305 can monitor one or more internal sensors of the mobile device 304 (e.g., GPS, IMU, compass, etc.), one or more external "add-on" sensors (such as a sensing device 214), or other (open sourced or licensed) geospatial surveying apps, to extract information (direction, bearing, etc.) that can be used for track generation calculations. The users 302 or the mobile device 304 then report the information about the UAS 306 to the server 310 via the app 305.

The server 310 receives the information, including any location information, of the UAS 306 and examines geospatial information of the space around the UAS 306 to determine if there are any vulnerable areas (such as crowded events, important assets, a military base, and the like). The server 310 also notifies a crowd of users 302 in a larger area (such as within a 5 kilometer radius of the UAS 306) to look for a controller or operator of the UAS 306. For example, the users 302 may use their mobile devices 304 to electronically sense a network or transmission band (such as Wi-Fi, radio frequency (RF), cellular, or the like) in which the controller and the UAS 306 communicate. The users 302 may also simply walk around and visually look for the UAS controller or operator and report the information to the server 310 via the app 305.

Once the server 310 obtains information about the UAS 306 or its controller/operator, the server 310 performs an assessment of the UAS 306 and its potential threat. In some embodiments, assessment of the UAS 306 can be performed using machine learning techniques. One example of this type of technique is described in U.S. patent application Ser. No. 16/946,157 filed on Jun. 8, 2020, which is hereby incorporated by reference in its entirety. Based on the assessment, the server 310 can escalate to another authorized actor for further adjudication or mitigation, or de-escalate if the assessment indicates a low threat. The server 310 can also or alternatively send assessment information of the UAS 306 to one or more of the users 302 or to one or more interested third parties. The interested third parties can include law enforcement personnel, entities responsible for business assets near the UAS 306 or its flight path, property owners, and the like.

In some embodiments, the freemium business model can include a subscription-based service provided by the entity 312. In the subscription-based service, subscribers may receive a greater level of information about the UAS 306. Subscribers can include one or more of the users 302. Other subscribers can include those who might not be interested in searching for UASs but would like to be aware of UASs in their vicinity. For example, a subscriber might be a celebrity who wants to know when a UAS is near his or her house. Note, however, that the approaches described in this patent document are not limited to any particular business model or other implementation to encourage users to participate.

In the environment 300, the server 310 is able to use information from the mobile devices 304 or other data heterogeneous sources (e.g., geospatial mapping, criminal records databases, etc.) to integrate and compress the intelligence cycle, the law enforcement suspicious activity investigatory cycle, and the military "kill chain" for pop-up UAS threats and improve the efficiency of the adjudication and action decision processes. In conventional approaches, there are multiple inefficiencies in the processes that result from lack of education, clear roles, responsibilities, authorities, and mitigation solutions. This hinders the timely and efficient notification, adjudication, and appropriate mitigation of potential threats by all actors in the community. The environment 300 integrates and compresses all three processes by defining clear roles, responsibilities, authorities, and mitigation solutions of the different actors (including both non-traditional and traditional actors) and by reducing the friction and time associated with communication and coordination between the actors in the kill chain. For example, the UAS information provided by the mobile devices 304 to the server 310 can fill in gaps in traditional kill chain sensor coverage.

The environment 300 shifts the majority of the sensing infrastructure acquisition, staffing, and sustainment costs to a large potential network of users 302, who each have access to his or her own independent mobile device 304. This solves the problems of needing to scale and cost to deploy, staff, and sustain a low altitude sensing infrastructure. As the network of users 302 grows, the coverage provided by the environment 300 scales up. This can be particularly advantageous around soft targets, such as large public events.

Although FIG. 3 illustrates one example of an environment 300 in which crowd-sourced detection and tracking of UASs can be performed, various changes may be made to FIG. 3. For example, operational environments come in a wide variety of configurations, and FIG. 3 does not limit this disclosure to any particular environment.

Figure 4:
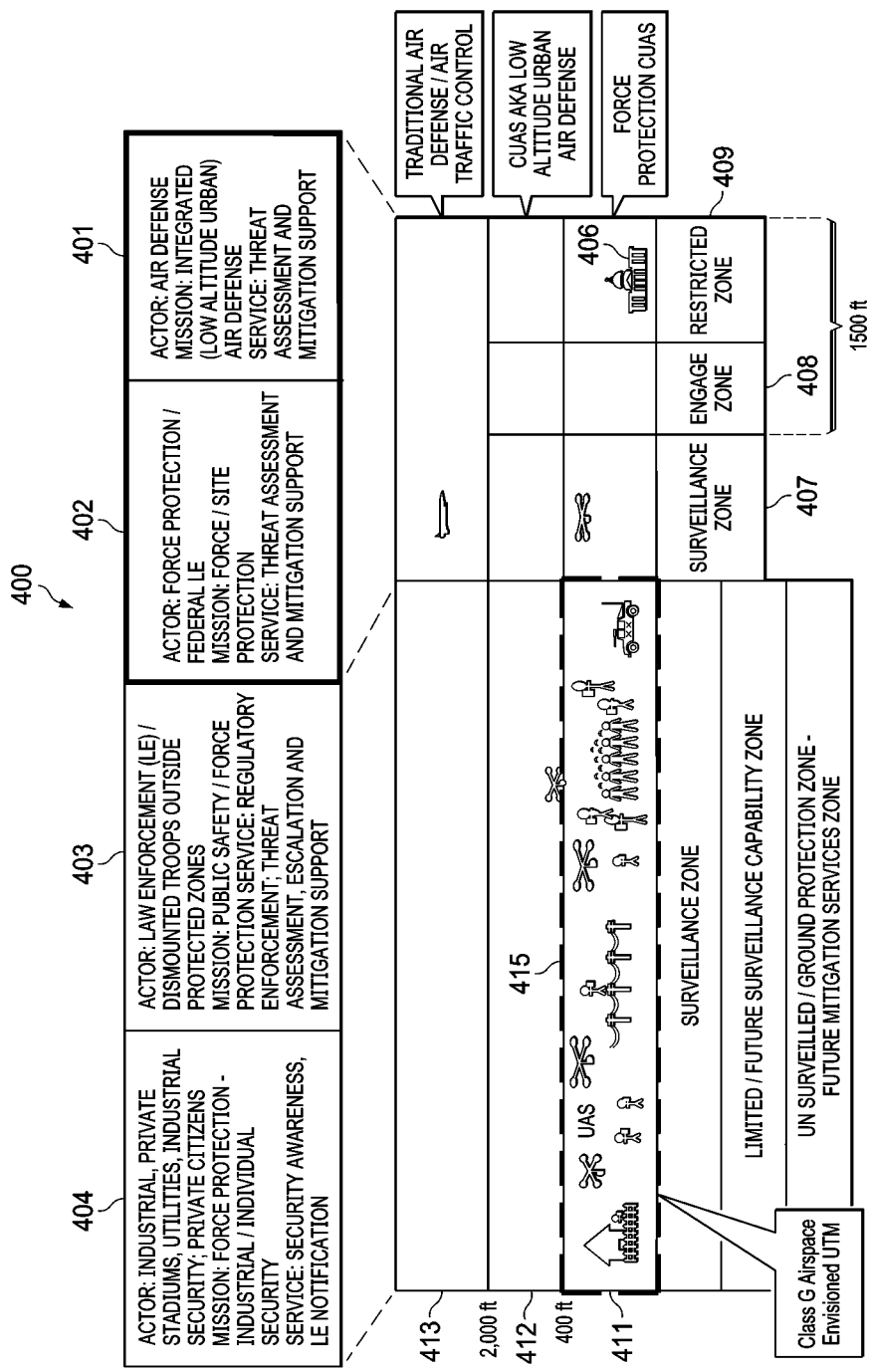
FIG. 4 illustrates an example geospatial representation of a counter-UAS solution in which crowd-sourced detection and tracking of UASs can be performed according to this disclosure.

FIG. 4 illustrates an example geospatial representation of a counter-UAS solution 400 in which crowd-sourced detection and tracking of UASs can be performed according to this disclosure. For ease of explanation, the counter-UAS solution 400 is described as being used with the environment 300 of FIG. 3 and may include the system 100 of FIG. 1. However, the counter-UAS solution 400 may involve the use of any suitable device(s), environment(s), and system(s).

As shown in FIG. 4, the counter-UAS solution 400 includes multiple groups of actors 401-404. The actors 401 include traditional air defense (such as the military) for protection from planes, missiles, and the like. The actors 402 include newer air defense actors, such as military police. The actors 403 include local non-military authorities like local law enforcement (such as civilian police forces). The actors 404 include private actors, such as businesses, industry, utilities, concerned individuals (e.g., celebrities or individuals who greatly value their privacy), and the like.

Each group of actors 401-404 has one or more counter-actions that the actors 401-404 can take in the event of a UAS sighting. For example, both actors 401 and 402 have authority for interdiction when a UAS is observed, such as destroying the UAS, interfering with operation of the UAS, and the like. The type of interdiction performed can depend on how close the UAS is to a particular protected asset 406. For example, depending on whether the UAS enters a surveillance zone 407, an engagement zone 408, or a restricted zone 409 associated with the asset 406, the type of interdiction can become more significant. Each zone 407-409 can be defined by a radius from the asset 406. In some embodiments, the actors 403 and 404 do not have authority to perform any interdiction of UASs. However, the actors 403 and 404 can issue orders to people and businesses (such as an order to take cover).

The counter-UAS solution 400 is also defined by altitude zones 411-413, where the altitude zone 411 is low altitude (such as less than 400 feet), the altitude zone 412 is mid altitude (such as 400 feet to 2,000 feet), and the altitude zone 413 is high altitude (such as greater than 2,000 feet). Of course, these values are merely examples, and other embodiments may include different numbers of altitude zones at different thresholds. In some cases, the crowd-sourced detection and tracking systems and methods disclosed here can be performed in the low altitude zone 411 and in a surveillance zone 407 as represented by the dashed lines indicated at 415. However, other use cases of the crowd-sourced detection and tracking systems and methods may be possible.

Although FIG. 4 illustrates one example of a counter-UAS solution 400 in which crowd-sourced detection and tracking of UASs can be performed, various changes may be made to FIG. 4. For example, the solution 400 can include any suitable number of actors, surveillance zones, altitude zones, and counter-actions.

Figure 5:
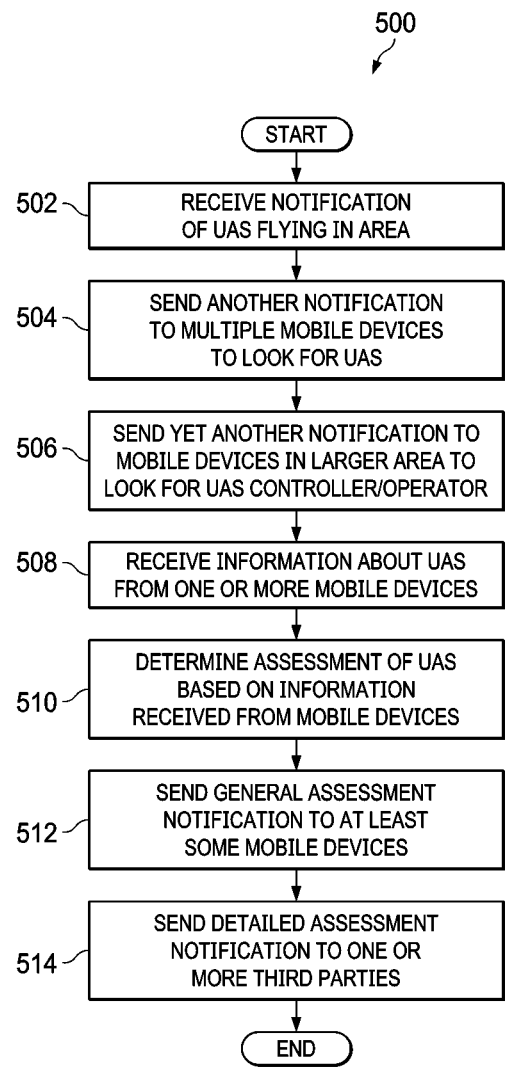
FIG. 5 illustrates an example method for crowd-sourced detection and tracking of UASs according to this disclosure.

FIG. 5 illustrates an example method 500 for crowd-sourced detection and tracking of UASs according to this disclosure. For ease of explanation, the method 500 of FIG. 5 may be described as being performed in the environment 300 using the system 100, which may be implemented using one or more devices 200 of FIG. 2. However, the method 500 may involve the use of any suitable device(s) and system(s) in any suitable environment(s).

As shown in FIG. 5, a notification of a UAS flying in an area is received at step 502. The notification is received from at least one of multiple users or from a third-party system that detects a presence of an unidentified object in the area. This may include, for example, the server 310 receiving a notification about the UAS 306 from at least one of the users 302 or a third-party system.

Another notification is sent to multiple mobile devices of multiple users located in the area at step 504. The notification requests the users to look for the UAS. In some embodiments, the notification is provided to the users via an application installed on the mobile devices. This may include, for example, the server 310 sending a notification to the mobile devices 304 that is provided to the users 302 via the app 305.

Yet another notification may be sent to the multiple mobile devices and to other mobile devices of other users located in a larger area at step 506. The notification requests the multiple users and the other users to look for a controller of the UAS or an operator of the UAS. This may include, for example, the server 310 sending a notification to the mobile devices 304 in the larger area.

Information about the UAS is received from one or more mobile devices of one or more users at step 508. The information is obtained by the one or more mobile devices. In some embodiments, the information about the UAS includes one or more images or videos of the UAS captured by the mobile devices, wireless control signal information from the UAS or a controller of the UAS detected by the mobile devices, location data of the UAS obtained by the mobile devices, track data of the UAS, or a combination of these. This may include, for example, the server 310 receiving information about the UAS 306 from the mobile devices 304.

An assessment of the UAS is determined at step 510 based on the information about the UAS received from the one or more mobile devices and/or other heterogeneous data sources. This may include, for example, the server 310 determining an assessment of the UAS 306 based on the information received from the mobile devices 304.

A general notification is sent to at least some of the multiple mobile devices at step 512. The notification includes information regarding the assessment of the UAS. This may include, for example, the server 310 sending an assessment notification to at least some of the mobile devices 304. The assessment information sent to the mobile devices 304 may be comparatively general information about the UAS 306 (although it may be more detailed if desired).

A detailed notification is sent to one or more third parties at step 514. The notification includes more detailed information regarding the assessment of the UAS, such as specific detailed identification information or a detailed assessment of a threat posed by the UAS. The one or more third parties can include at least one subscriber of a service associated with UAS detection, law enforcement personnel, at least one property owner, at least one entity responsible for a business asset near the UAS or its flight path, or a combination of these. This may include, for example, the server 310 sending a detailed report notification to the third parties.

Although FIG. 5 illustrates one example of a method 500 for crowd-sourced detection and tracking of UASs, various changes may be made to FIG. 5. For example, while shown as a series of steps, various steps in FIG. 5 may overlap, occur in parallel, occur in a different order, or occur any number of times.

Among other things, the embodiments described above provide for the expansion of air defense to non-traditional actors, including civilian, commercial, and law enforcement actors. In some cases, the UAS information collected in the disclosed embodiments can fill in gaps in the military kill chain, the Intelligence Community (IC) intelligence cycle, and the Law Enforcement Suspicious Activity Report investigation cycle. Also, in some cases, the collected information can be provided to traditional or institutional kill chain actors or other law enforcement personnel who have additional active mitigation authorizations.

In some embodiments, various functions described in this patent document are implemented or supported by a computer program that is formed from computer readable program code and that is embodied in a computer readable medium. The phrase "computer readable program code" includes any type of computer code, including source code, object code, and executable code. The phrase "computer readable medium" includes any type of medium capable of being accessed by a computer, such as read only memory (ROM), random access memory (RAM), a hard disk drive, a compact disc (CD), a digital video disc (DVD), or any other type of memory. A "non-transitory" computer readable medium excludes wired, wireless, optical, or other communication links that transport transitory electrical or other signals. A non-transitory computer readable medium includes media where data can be permanently stored and media where data can be stored and later overwritten, such as a rewritable optical disc or an erasable storage device.

It may be advantageous to set forth definitions of certain words and phrases used throughout this patent document. The terms "application" and "program" refer to one or more computer programs, software components, sets of instructions, procedures, functions, objects, classes, instances, related data, or a portion thereof adapted for implementation in a suitable computer code (including source code, object code, or executable code). The term "communicate," as well as derivatives thereof, encompasses both direct and indirect communication. The terms "include" and "comprise," as well as derivatives thereof, mean inclusion without limitation. The term "or" is inclusive, meaning and/or. The phrase "associated with," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, have a relationship to or with, or the like. The phrase "at least one of," when used with a list of items, means that different combinations of one or more of the listed items may be used, and only one item in the list may be needed. For example, "at least one of: A, B, and C" includes any of the following combinations: A, B, C, A and B, A and C, B and C, and A and B and C.

The description in the present application should not be read as implying that any particular element, step, or function is an essential or critical element that must be included in the claim scope. The scope of patented subject matter is defined only by the allowed claims. Moreover, none of the claims invokes 35 U.S.C. § 112(f) with respect to any of the appended claims or claim elements unless the exact words "means for" or "step for" are explicitly used in the particular claim, followed by a participle phrase identifying a function. Use of terms such as (but not limited to) "mechanism," "module," "device," "unit," "component," "element,"

"member," "apparatus," "machine," "system," "processor," or "controller" within a claim is understood and intended to refer to structures known to those skilled in the relevant art, as further modified or enhanced by the features of the claims themselves, and is not intended to invoke 35 U.S.C. § 112(f).

While this disclosure has described certain embodiments and generally associated methods, alterations and permutations of these embodiments and methods will be apparent to those skilled in the art. Accordingly, the above description of example embodiments does not define or constrain this disclosure. Other changes, substitutions, and alterations are also possible without departing from the spirit and scope of this disclosure, as defined by the following claims.

What is claimed is:

1. A method comprising:
receiving a first notification of an unmanned aerial system (UAS) flying in an area;
sending a second notification to multiple mobile devices of multiple users located in the area, the second notification requesting the multiple users to look for the UAS;
receiving information about the UAS from one or more of the mobile devices of one or more of the users, the information obtained by the one or more mobile devices;
determining an assessment of the UAS based on the information about the UAS received from the one or more mobile devices;
sending a third notification to at least some of the mobile devices, the third notification comprising information regarding the assessment of the UAS; and
sending a fourth notification to at least some of the mobile devices and other mobile devices of other users located in a larger area, the fourth notification requesting the users and the other users to look for a controller or an operator of the UAS.

2. The method of claim 1, wherein the information about the UAS comprises at least one of:
one or more images or videos of the UAS captured by the one or more mobile devices;
wireless control signal information from the UAS or the controller of the UAS detected by the one or more mobile devices; and
location data of the UAS obtained by the one or more mobile devices.

3. The method of claim 1, wherein the second notification is provided to the users via an application installed on the mobile devices.

4. The method of claim 1, wherein the first notification is received from one of the users or from a third-party system that detects a presence of an unidentified object in the area.

5. The method of claim 1, further comprising:
providing a reward to at least one of the users in response to the at least one user submitting useful information about the UAS.

6. The method of claim 1, further comprising:
sending a fifth notification to one or more third parties, the fifth notification comprising second information regarding the assessment of the UAS.

7. The method of claim 6, wherein the one or more third parties comprise at least one of: a subscriber of a service associated with UAS detection, law enforcement personnel, at least one property owner, and at least one entity responsible for a business asset near the UAS or its flight path.

8. A device comprising:
at least one memory configured to store instructions; and
at least one processor coupled to the at least one memory and configured when executing the instructions to:
receive a first notification of an unmanned aerial system (UAS) flying in an area;
send a second notification to multiple mobile devices of multiple users located in the area, the second notification requesting the multiple users to look for the UAS;
receive information about the UAS from one or more of the mobile devices of one or more of the users, the information obtained by the one or more mobile devices;
determine an assessment of the UAS based on the information about the UAS received from the one or more mobile devices;
send a third notification to at least some of the mobile devices, the third notification comprising information regarding the assessment of the UAS; and
send a fourth notification to at least some of the mobile devices and other mobile devices of other users located in a larger area, the fourth notification requesting the users and the other users to look for a controller or an operator of the UAS.

9. The device of claim 8, wherein the information about the UAS comprises at least one of:
one or more images or videos of the UAS captured by the one or more mobile devices;
wireless control signal information from the UAS or the controller of the UAS detected by the one or more mobile devices; and
location data of the UAS obtained by the one or more mobile devices.

10. The device of claim 8, wherein the second notification is provided to the users via an application installed on the mobile devices.

11. The device of claim 8, wherein the at least one processor is configured to receive the first notification from one of the users or from a third-party system that detects a presence of an unidentified object in the area.

12. The device of claim 8, wherein the at least one processor is further configured to provide a reward to at least one of the users in response to the at least one user submitting useful information about the UAS.

13. The device of claim 8, wherein the at least one processor is further configured to send a fifth notification to one or more third parties, the fifth notification comprising second information regarding the assessment of the UAS.

14. The device of claim 13, wherein the one or more third parties comprise at least one of: a subscriber of a service associated with UAS detection, law enforcement personnel, at least one property owner, and at least one entity responsible for a business asset near the UAS or its flight path.

15. A non-transitory computer readable medium containing instructions that when executed cause at least one processor to:
receive a first notification of an unmanned aerial system (UAS) flying in an area;
send a second notification to multiple mobile devices of multiple users located in the area, the second notification requesting the multiple users to look for the UAS;
receive information about the UAS from one or more of the mobile devices of one or more of the users, the information obtained by the one or more mobile devices;
determine an assessment of the UAS based on the information about the UAS received from the one or more mobile devices;

send a third notification to at least some of the mobile devices, the third notification comprising information regarding the assessment of the UAS; and send a fourth notification to at least some of the mobile devices and other mobile devices of other users located in a larger area, the fourth notification requesting the users and the other users to look for a controller or an operator of the UAS.

16. The non-transitory computer readable medium of claim 15, wherein the information about the UAS comprises at least one of:

one or more images or videos of the UAS captured by the one or more mobile devices;

wireless control signal information from the UAS or the controller of the UAS detected by the one or more mobile devices; and location data of the UAS obtained by the one or more mobile devices.

17. The non-transitory computer readable medium of claim 15, wherein the second notification is provided to the users via an application installed on the mobile devices.

18. The non-transitory computer readable medium of claim 15, wherein the instructions when executed further cause the at least one processor to receive the first notification from one of the users or from a third-party system that detects a presence of an unidentified object in the area.

19. The non-transitory computer readable medium of claim 15, wherein the instructions when executed further cause the at least one processor to provide a reward to at least one of the users in response to the at least one user submitting useful information about the UAS.

20. The non-transitory computer readable medium of claim 15, wherein the instructions when executed further cause the at least one processor to send a fifth notification to one or more third parties, the fifth notification comprising second information regarding the assessment of the UAS.

* * * * *